US 6,691,549 B2

(12) United States Patent
Froeschl et al.

(10) Patent No.: US 6,691,549 B2
(45) Date of Patent: Feb. 17, 2004

(54) METHOD OF CALIBRATING A ROLLOVER SENSOR

(75) Inventors: Joachim Froeschl, Seefeld (DE); Robert Griessbach, Weyarn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 294 days.

(21) Appl. No.: 09/755,192

(22) Filed: Jan. 8, 2001

(65) Prior Publication Data
US 2001/0020900 A1 Sep. 13, 2001

(30) Foreign Application Priority Data
Jan. 8, 2000 (DE) .......................... 100 00 535

(51) Int. Cl.[7] .............................................. G01L 25/00
(52) U.S. Cl. .............................................. 73/1.75
(58) Field of Search .............................. 73/1.75, 1.77, 73/1.78, 1.88

(56) References Cited

U.S. PATENT DOCUMENTS

| 3,107,514 | A | * | 10/1963 | Walker | 73/1.77 |
| 3,731,521 | A | * | 5/1973 | Solov et al. | 73/1.77 |
| 4,470,124 | A | * | 9/1984 | Tagami et al. | 73/1.88 |
| 5,321,616 | A | * | 6/1994 | Okuda et al. | |
| 5,610,575 | A | | 3/1997 | Gioutsos | 340/429 |
| 5,922,039 | A | * | 7/1999 | Welch et al. | |

FOREIGN PATENT DOCUMENTS

| DE | 19547830 | 7/1997 |
| DE | 197 36 328 A1 | 8/1997 |
| DE | 19736328 | 2/1999 |
| EP | 965 502 A2 | 6/1999 |
| EP | 0965502 | 10/2000 |
| JP | 0003276891 AA | 3/1990 |
| WO | 99/05004 | 2/1999 |

* cited by examiner

Primary Examiner—Robert Raevis
(74) Attorney, Agent, or Firm—Crowell & Moring LLP

(57) ABSTRACT

A rollover sensor for a vehicle continuously determines the inclination of a vehicle in at least one axis. In order to cancel drift deviations in the sensor, the inclination is average in the at least one axis, continuously along a defined route. The formed average value is assumed as the zero position. Inclination of the vehicle due to inclination of the road surface is compensated based on variations in ambient air pressure indicative of changes in altitude.

10 Claims, 1 Drawing Sheet

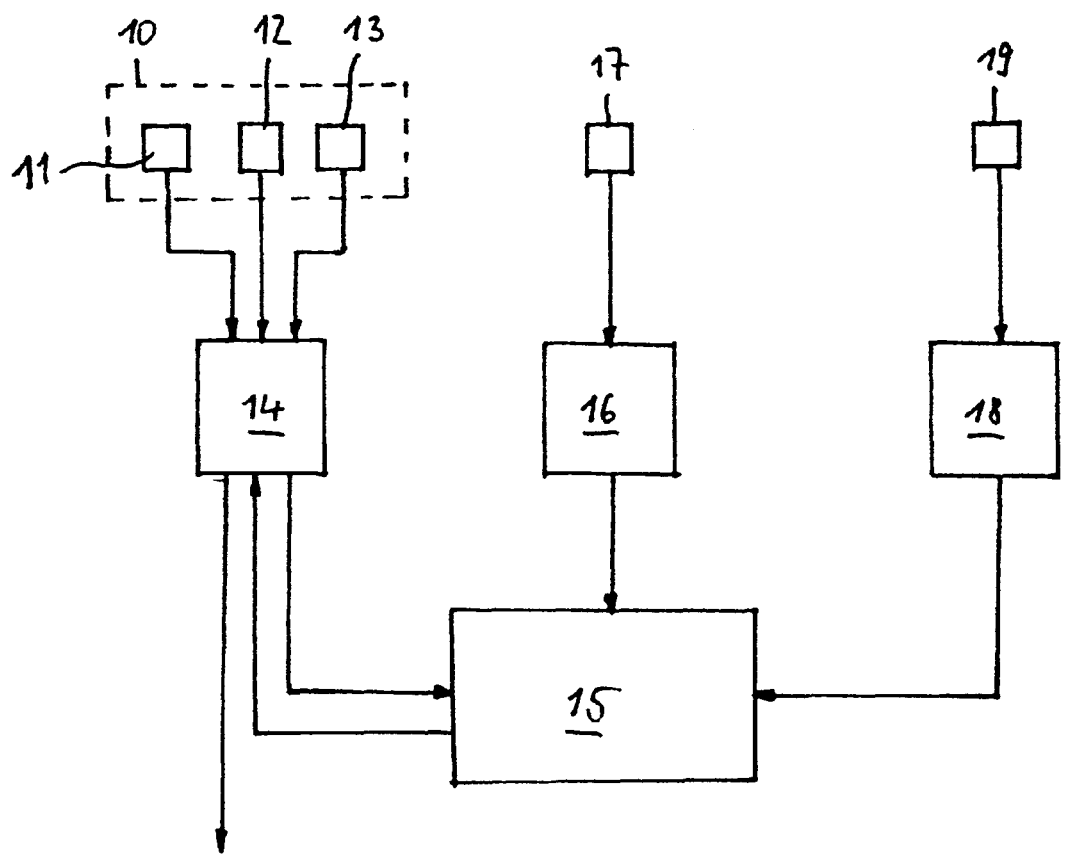

METHOD OF CALIBRATING A ROLLOVER SENSOR

BACKGROUND AND SUMMARY OF THE INVENTION

This application claims the priority of German patent document 100 00 535.7, filed Jan. 8, 2000, the disclosure of which is expressly incorporated by reference herein.

The invention relates to a method of calibrating a rollover sensor for a vehicle.

In such rollover sensors, acceleration sensors which can determine the alignment of a vehicle in space (particularly in the three space axes) are generally used to detect rollover events. A problem of using more favorably produced sensors is their fluctuation around the zero position, which is mainly caused by temperature effects.

It is an object of the invention to provide a method by which an initially mentioned rollover sensor can be calibrated in a simple manner.

This and other objects and advantages are achieved by the method according to the invention, in which the inclination reported by a rollover sensor is continuously averaged along a defined route in at least one axis. By means of such averaging along a covered route, any drift is canceled out. The average value will then correspond to the zero position. Preferably inclination measurements and assigned averaging take place in all three space axes.

For inclinations about the longitudinal axis, the above-selected method will be sufficient. In the case of inclinations about the transverse axis, however, it may occur that during extended uphill or downhill drives, as a result of the average inclination of the road, errors occur which are caused by the averaging process.

To avoid this effect, in a particularly preferred embodiment, the average inclination is determined along a defined route from the air pressure change along this route. More precisely, the absolute air pressure can be determined by means of an air pressure sensor and, from the barometric altitude formula, the altitude of the vehicle above sea level can be determined. As a result, a change of altitude can be determined in a simple manner along a defined route. In this case, weather-caused air pressure fluctuations are averaged out. By means of the quotient of the altitude change with respect to the defined driving route, the average inclination can be computed along this route, and used to correct the determined, averaged inclination in the driving direction.

In many vehicles, pressure sensors are already used in the door area for detecting lateral collisions. In the future, the electronic system of the engine will also have an air pressure sensor for taking into account the influence of the ambient air pressure on the power of the engine. By using these existing air pressure sensors for the present invention, the use of additional hardware components is avoided.

Other objects, advantages and novel features of the present invention will become apparent from the following detailed description of the invention when considered in conjunction with the accompanying drawings.

BRIEF DESCRIPTION OF THE DRAWINGS

The FIGURE of the drawing shows a schematic block diagram of an embodiment of the present invention.

DETAILED DESCRIPTION OF THE DRAWINGS

In the FIGURE, three acceleration sensors 11, 12, and 13 are arranged in a housing of a rollover sensor 10, which transmits their signal to an analyzing device 14. The analyzing device 14, in turn, transmits the inclination signals to a correction unit 15 which, in addition, is provided by way of a first electronic interface system 16 with information from a route sensor 17, such as a rotational speed sensor.

Furthermore, the correction unit 15 is connected with a second electronic interface system 18 which, in turn, receives signals from a pressure sensor 19. The second electronic interface system 18 transmits an air pressure signal to the correction unit 15.

A special algorithm is implemented in the correction unit 15. On the one hand, the values of the acceleration sensors 11, 12 and 13 are averaged along a defined driving route and a zero position is determined. On the other hand, the air pressure difference is determined along a defined route by means of the air pressure sensor. With the aid of a barometric altitude formula and with reference to the altitude change along a defined driving route, an average inclination of the vehicle about its transverse axis is then determined along this driving route. This average inclination is used to correct the averaging result of the inclination sensor with respect to the transverse axis.

The determined zero positions in the various space axes are then returned from the correction unit 15 to the analyzing device 14 which, on the basis of these signals, transmits to another electronic safety system (not shown) the actual information concerning the position of the vehicle with respect to the three space axes.

On the whole, the present invention creates a simple and cost-effective process for calibrating a rollover sensor. Because the addressed hardware components already exist in most vehicles, the present method according to the invention can be implemented at particularly reasonable cost.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of calibrating a rollover sensor for a vehicle in which inclination of the vehicle is continuously determined about at least one axis, wherein:
   determined inclination of the vehicle is continuously averaged about the at least one axis, as the vehicle travels along a driving route on a roadway; and
   a formed average value is assumed to be a zero position for the rollover sensor;
   wherein the average is formed continuously over said roadway, including portions of said roadway which are not straight and portions which are not flat.

2. The method according to claim 1, wherein:
   inclinations are determined in all three space axes; and
   pertaining zero positions are determined for each axis, by averaging.

3. The method according to claim 1, wherein:
   by means of an air pressure sensor, an altitude change is determined along the driving route traveled by the vehicle;
   the altitude change is related to the driving route, and an actual average inclination of the vehicle is thereby computed along the driving route; and
   by means of the computed actual average inclination, determined inclination in a driving direction determined by means of the rollover sensor, is corrected.

4. The method according to claim 3, wherein said air pressure sensor comprises one of a pressure sensor arranged in a door of the vehicle for detecting lateral collisions, and a pressure sensor in an electronic engine system for taking into account an influence of air pressure upon power of the engine.

5. A method of calibrating a rollover sensor for a vehicle in which inclination of the vehicle is continuously determined about at least one axis, comprising:

continuously forming an average inclination of the vehicle determined by said rollover sensor, as the vehicle travels along a roadway, to determine an average inclination value;

using the continuously formed average inclination value as a zero position for the rollover sensor;

wherein the average is formed continuously over said roadway, including portions of said roadway which are not straight and portions which are not flat.

6. The method according to claim 5, wherein:

inclinations are determined in all three space axes; and pertaining zero positions are determined for each axis, by averaging.

7. The method according to claim 5, further comprising:

determining an altitude change for said route traveled by the vehicle, based on signals from an air pressure sensor; and correcting the formed average inclination based on said altitude change.

8. The method according to claim 7, wherein said air pressure sensor comprises one of a pressure sensor arranged in a door of the vehicle for detecting lateral collisions, and a pressure sensor in an electronic engine system for taking into account an influence of air pressure upon power of the engine.

9. A method for detecting rollover events for a vehicle, comprising:

a rollover sensor continuously determining an inclination of the vehicle about at least one axis as the vehicle travels along a roadway;

continuously averaging determined inclination of the vehicle about the at least one axis as the vehicle travels over the roadway; and using the continuously formed average inclination as a zero position for the rollover sensor in determining existence of a rollover event;

wherein the average is formed continuously over said roadway, including portions of said roadway which are not straight and portions which are not flat.

10. The method according to claim 9, further comprising:

determining an altitude change for said route traveled by the vehicle, based on signals from an air pressure sensor; and correcting the formed average inclination based on said altitude change.

* * * * *